(12) United States Patent
Hans et al.

(10) Patent No.: US 11,987,705 B2
(45) Date of Patent: May 21, 2024

(54) RUBBER COMPOSITION AND A TIRE COMPRISING A RUBBER COMPOSITION

(71) Applicant: The Goodyear Tire & Rubber Company, Akron, OH (US)

(72) Inventors: Michael Hans, Trier (DE); Gary Terence Barrett, Sutton Coldfield (GB); Steve Ludwig, Butzbach (DE); Christian Jean-Marie Kaes, Schrondweiler (LU); Anna Katharina Bier, Hanau (DE); Björn Springer, Bruchköbel (DE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 189 days.

(21) Appl. No.: 17/804,115

(22) Filed: May 26, 2022

(65) Prior Publication Data
US 2023/0383100 A1    Nov. 30, 2023

(51) Int. Cl.
| | |
|---|---|
| *C08L 9/06* | (2006.01) |
| *B60C 1/00* | (2006.01) |
| *C08K 3/04* | (2006.01) |
| *C08K 3/22* | (2006.01) |
| *C08K 3/36* | (2006.01) |
| *C08K 5/01* | (2006.01) |
| *C08K 5/548* | (2006.01) |
| *C08L 93/04* | (2006.01) |

(52) U.S. Cl.
CPC .............. *C08L 9/06* (2013.01); *B60C 1/0016* (2013.01); *C08K 3/04* (2013.01); *C08K 3/22* (2013.01); *C08K 3/36* (2013.01); *C08K 5/01* (2013.01); *C08K 5/548* (2013.01); *C08L 93/04* (2013.01); *B60C 2200/04* (2013.01); *C08K 2003/2227* (2013.01); *C08K 2201/006* (2013.01); *C08L 2205/02* (2013.01)

(58) Field of Classification Search
CPC .. C08L 9/06; C08L 93/04; C08K 3/36; C08K 3/04; C08K 3/22; C08K 5/01; C08K 5/548; B60C 1/00

USPC ......................................................... 523/156
See application file for complete search history.

(56) References Cited

U.S. PATENT DOCUMENTS

| | | | |
|---|---|---|---|
| 6,653,387 B2 | 11/2003 | Causa et al. | |
| 7,259,205 B1 * | 8/2007 | Pagliarini | B60C 1/0016 524/495 |
| 8,490,666 B2 | 7/2013 | Margot et al. | |
| 2015/0329696 A1 | 11/2015 | Miyazaki | |
| 2017/0341468 A1 | 11/2017 | Miyazaki | |
| 2019/0062537 A1 * | 2/2019 | Mejia | C08K 5/5419 |
| 2021/0277212 A1 | 9/2021 | Takagi et al. | |
| 2021/0395501 A1 * | 12/2021 | Engeldinger | B60C 1/0008 |

FOREIGN PATENT DOCUMENTS

| | | | |
|---|---|---|---|
| EP | 0829511 A1 | 3/1998 | |
| EP | 3511179 A1 | 7/2019 | |
| EP | 3617262 A1 | 3/2020 | |
| JP | 2013071938 A * | 4/2013 | |
| WO | WO-2018203533 A1 * | 11/2018 | B60C 1/00 |

OTHER PUBLICATIONS

U.S. Appl. No. 63/250,310, filed Sep. 30, 2021.
U.S. Appl. No. 63/250,327, filed Sep. 30, 2021.
U.S. Appl. No. 63/250,363, filed Sep. 30, 2021.
Extended European Search Report for Application No. 23174730.4, dated Aug. 24, 2023.

* cited by examiner

*Primary Examiner* — Deve V Hall
(74) *Attorney, Agent, or Firm* — Mandy B. Willis

(57) ABSTRACT

A rubber composition comprising 50 phr to 100 phr of a styrene butadiene rubber; 0 phr to 50 phr of at least one diene based rubber; 95 phr to 200 phr of filler comprising i) 50 phr to 100 phr of silica, ii) 40 phr to 70 phr of carbon black and iii) 5 phr to 30 phr of an inorganic metal hydroxide; 40 phr to 80 phr of plasticizer comprising a hydrocarbon resin having a softening point within a range of 80° C. and 130° C.

19 Claims, No Drawings

RUBBER COMPOSITION AND A TIRE COMPRISING A RUBBER COMPOSITION

FIELD OF THE INVENTION

The present invention is directed to a rubber composition, in particular a sulfur curable or cured rubber composition, e.g., for a tire. Moreover, the present invention is directed to a rubber component comprising such a rubber composition as well as to a tire comprising said rubber composition and/or rubber component.

BACKGROUND OF THE INVENTION

The tire industry has been developing tires particularly suitable for different weather conditions. While ultra-high performance (UHP) tires or ultra-ultra-high performance (UUHP) tires are often designed to have superior dry performance, an improved wet performance is also desirable for many customers to improve handling and safety under wet weather conditions. At the same time, such tires shall ideally have no or at least only limited tradeoffs in dry handling as well as in rolling resistance and/or tread wear so as to provide limited fuel or energy consumption and a sustainable product.

SUMMARY OF THE INVENTION

One object of the present invention may be to provide a rubber composition for a tire providing good dry handling performance and improved wet handling performance.

Another object of the present invention may be to provide a rubber composition for a tire providing an advanced balance between dry handling performance, wet handling performance and rolling resistance, and preferably also tread wear.

Yet another object of the present invention may be to provide a UHP, UUHP and/or race tire having an advanced wet handling performance, preferably with at least one of limited treadwear, good dry handling performance and/or low rolling resistance.

The present invention is defined by the scope of appended claim 1. Further embodiments are provided in the dependent claims and the summary herein below.

Thus, in a first aspect, the present invention is directed to a rubber composition comprising 50 phr to 100 phr of a styrene butadiene rubber (which is preferably solution polymerized); 0 phr to 50 phr of at least one (further) diene based rubber; 95 phr to 200 phr of filler comprising: i) 50 phr to 100 phr of silica, ii) 40 phr to 70 phr of carbon black and iii) 5 phr to 30 phr of a, preferably inorganic, metal hydroxide. Moreover, the rubber composition comprises 40 phr to 80 phr of plasticizer comprising a hydrocarbon resin having a softening point within a range of 80° C. to 130° C. In particular, such a rubber composition including a blend of substantial amounts of carbon black and silica in combination with the inorganic metal hydroxide has turned out to provide an advanced balance between dry handling performance, wet handling performance and abrasion.

In one embodiment, the filler comprises one or more of: from 50 phr to 80 phr (preferably from 50 to 75 phr, or even more preferably from 55 to 70 phr) of the silica, from 45 phr to 65 phr (preferably from 45 to 60 phr, or even more preferably from 50 to 60 phr) of the carbon black, and from 10 phr to 25 phr (preferably from 11 phr to 20 phr) of the metal hydroxide.

In another embodiment, the filler comprises at least 5 phr more silica than carbon black and/or at most 20 phr more silica than carbon black, preferably at most 15 phr more silica than carbon black. Thus, while the composition comprises substantial amounts of carbon black, a higher amount of silica than carbon black is preferred herein.

In still another embodiment, the inorganic metal hydroxide is aluminum hydroxide. Such a material has turned out to be the most preferred inorganic metal hydroxide.

In yet another embodiment the aluminum hydroxide has one or more of: i) a BET surface area within a range of 1 $m^2/g$ to 50 $m^2/g$, preferably from 2 $m^2/g$ to 20 $m^2/g$, or even more preferably 10 $m^2/g$; and ii) a d50 value within a range of 0.1 µm to 10 µm, preferably 5 µm, or even more preferably 3 µm. Aluminum hydroxide particle diameters are determined with a Zetasizer™ Nano S from Malvern using dynamic light scattering, based on ISO 22412 or equivalent. The BET surface area of aluminum hydroxide particles is determined in accordance with ISO 9277 or equivalent.

In still another embodiment, the rubber composition comprises from 100 phr to 150 phr, preferably from 110 phr to 150 phr, or even more preferably from 120 phr to 150 phr of the filler. Higher filler amounts would impact rolling resistance, whereas lower filler values would impact stiffness and handling properties.

In still another embodiment, the rubber composition comprises from 20 phr to 60 phr of oil, preferably from 30 phr to 50 phr of oil.

In yet another embodiment, the rubber composition comprises from 15 phr to 60 phr of the resin, or preferably from 15 phr to 40 phr of the resin. Preferably the resin is a traction resin.

In still another embodiment, the resin to oil ratio is between 1:1 to 1:4, preferably 1:1 to 1:3.

In still another embodiment, the rubber composition comprises from 15 phr to 35 phr of the resin and/or from 25 phr to 50 phr of oil.

In still another embodiment, the hydrocarbon resin is selected from one or more of coumarone-indene resin, petroleum hydrocarbon resin, terpene resin, styrene/alphamethylstyrene resin, terpene phenol resin, and optionally copolymers and/or mixtures thereof. In yet another embodiment, the resin may be hydrogenated and/or modified, or in other words functionalized.

In still another embodiment, the resin has a weight average molecular weight Mw within a range of 300 g/mol to 6000 g/mol, preferably 300 g/mol to 3000 g/mol. Mw is determined herein using gel permeation chromatography (GPC) according to ASTM 5296-11 using polystyrene calibration standards In still another embodiment, the resin is a DCPD resin, which is optionally hydrogenated and/or modified with an aromatic monomer, and wherein the resin has optionally a weight average molecular weight within a range of 300 g/mol to 1200 g/mol. In particular, such a resin has turned out to be advantageous for wet traction and rolling resistance trade off.

In still another embodiment, the resin has a glass transition temperature within a range of 30° C. to 90° C. Thus, a resin with a relatively high Tg, or softening point respectively, is preferred.

In still another embodiment, the rubber composition comprises from 50 phr to 80 phr of the plasticizer. Plasticizers can for example include liquid plasticizers such as oils or liquid polymers, e.g., liquid diene based polymers. Liquid plasticizer shall mean herein a plasticizer that is in a liquid state at a temperature of 23° C.

In still another embodiment, the composition comprises 1,6-bis(N,N-dibenzylthiocarbamoyldithio)hexane/BDBzTH, or a derivative thereof, preferably within a range of 0.5 phr to 5 phr.

In yet another embodiment, the composition comprises one or more reversion inhibitors such as 1,3 Bis(citraconimidamethyl)benzene, preferably within a range of 0.5 phr to 5 phr.

In still another embodiment, the rubber composition further comprises from 5 phr to 15 phr of one or more gum rosins (optionally, including at least partially dimerized gum rosins). Alternatively, the term gum rosin may also be replaced by rosin herein. One effect of those materials is an improved dry traction.

In still another embodiment, the rubber composition comprises from 3 phr to 9 phr of at least one silane, comprising or consisting of 3-(octanoylthio)-1-propyltriethoxysilane. One effect of this material is a reduced rolling resistance. Preferably, the rubber composition comprises from 5 phr to 9 phr or from 6 phr to 9 phr of this silane.

In still another embodiment, the silica has a BET surface area of at least 185 $m^2/g$, preferably of at least 195 $m^2/g$, or even more preferably of at least 200 $m^2/g$.

In yet another embodiment, the carbon black has an iodine absorption number of at least 180 g/kg, preferably at least 190 g/kg or even at least 200 g/kg and optionally at most 300 g/kg, preferably at most 280 g/kg.

In still another embodiment, the rubber composition comprises the diene based rubber, which is chosen from natural rubber, synthetic polyisoprene, polybutadiene rubber and (another) styrene butadiene rubber.

In still another embodiment, the styrene butadiene rubber has a glass transition temperature within a range of −10° C. (preferably −20° C.) to −49° C. (preferably −45° C.), wherein the further diene based rubber comprised in the rubber composition has a glass transition temperature within a range of −51° C. (preferably −60° C.) to −110° C.

In still another embodiment, the styrene butadiene rubber is a solution polymerized styrene butadiene rubber and/or has a glass transition temperature within a range of −10° C. (preferably −20° C.) to −45° C. and the rubber composition comprises from 70 phr to 95 phr of the solution polymerized styrene butadiene rubber, and wherein the rubber composition optionally comprises from 5 phr to 30 phr of the at least one (further) diene based rubber, preferably selected from one or more of natural rubber, synthetic polyisoprene, polybutadiene rubber and another styrene butadiene rubber.

In still another embodiment, the further diene based rubber comprised in the rubber composition comprises a polybutadiene rubber, preferably having a glass transition temperature within a range of −95° C. to −110° C.

In still another embodiment, the styrene butadiene rubber (which is the predominant polymer in the rubber composition) has a bound styrene content of at least 30%, preferably at least 35% and at most 50%; and/or a vinyl content of less than 25%, preferably less than 20% but more than 5%.

In yet another embodiment, the rubber composition comprises from 3 phr to 10 phr of a vegetable oil having a glass transition temperature of less than −90° C. (and preferably more than −105° C.); and/or from 20 phr to 40 phr of a mineral oil, such as TDAE oil. Amongst others, the low glass transition temperature of the vegetable oil helps to adjust the compound glass transition temperature and provides the compound also with more sustainable material.

In an embodiment, the rubber composition may include at least one and/or one additional diene-based rubber. Representative synthetic polymers may be the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, the composition may comprise at least two diene-based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers, and emulsion polymerization prepared butadiene/acrylonitrile copolymers.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 percent to 31 percent. By emulsion polymerization prepared ESBR, it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared SBR (SSBR) may be used. Such an SSBR may for instance have a bound styrene content in a range of 5 to 50 percent, preferably 9 to 36, percent, and most preferably 26 to 31 percent. The SSBR can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene. Other functionalizations include siloxy, silanol, carboxy, amino, amino silane, amino siloxane and other functionalizations known in the state of the art.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, cis-1,4-polybutadiene rubber (BR or PBD) is used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95° C. to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference.

A glass transition temperature, or Tg, of an elastomer represents the glass transition temperature of the respective elastomer in its uncured state. A glass transition temperature of an elastomer composition represents the glass transition temperature of the elastomer composition in its cured state. A Tg is determined as a peak midpoint by a differential scanning calorimeter (DSC) at a temperature rate of increase of 20° C. per minute, according to ASTM D3418 or equivalent.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3, phr of an additional diene-based rubber or be also essentially free of such an additional diene-based rubber. The terms "compound" and "composition" and "formulation" may be used herein interchangeably, unless indicated otherwise. The terms "rubber" and "elastomer" may also be used herein interchangeably.

Molecular weights of elastomers/rubbers, such as Mn (number average molecular weight), Mw (weight average molecular weight) and Mz (z average molecular weight), are determined herein using gel permeation chromatography (GPC) according to ASTM 5296-11 using polystyrene calibration standards, or equivalent.

A Tg for resins is determined as a peak midpoint by a differential scanning calorimeter (DSC) at a temperature rate of increase of 10° C. per minute, according to ASTM D6604 or equivalent. Preferably, the resin has a softening point above 70° C. as determined by ASTM E28 which might sometimes be referred to as a ring and ball softening point.

A coumarone-indene resin preferably contains coumarone and indene as monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cyclopentadiene, and diolefins such as isoprene and piperlyene. Coumarone-indene resins have preferably softening points ranging from 10° C. to 160° C. (as measured by the ball-and-ring method). Even more preferably, the softening point ranges from 30° C. to 100° C.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefines containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above, and are known as C5/C9 copolymer resins.

In an embodiment, C5 resins are aliphatic resins made from one or more of the following monomers: 1,3-pentadiene (e.g., cis or trans), 2-methyl-2-butene, cyclopentene, cyclopentadiene, and dicyclopentadiene.

In another embodiment, a C9 resin is a resin made from one or more aromatic monomers, preferably chosen from the group of indene, methylindene, vinyl toluene, styrene and methylstyrene (such as alpha-methylstyrene).

In still another embodiment, a C9 modified resin is a resin (such as a C5 resin) which has been modified or functionalized with one or more aromatic monomers, preferably chosen from the group of indene, methylindene, vinyl toluene, styrene and methylstyrene (such as alpha methylstyrene).

Terpene resins are preferably comprised of polymers of at least one of limonene, alpha pinene, beta pinene and delta-3-carene. Such resins are available with softening points ranging from 10° C. to 135° C.

Terpene-phenol resins may be derived by copolymerization of phenolic monomers with terpenes such as limonenes, pinenes and delta-3-carene.

A styrene/alphamethylstyrene resin is considered herein to be a (preferably relatively short chain) copolymer of styrene and alphamethylstyrene with a styrene/alphamethylstyrene molar ratio in a range of about 0.05 to about 1.50. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely its styrene and alphamethylstyrene contents and by its glass transition temperature, molecular weight and molecular weight distribution.

In one embodiment, said resin is partially or fully hydrogenated.

In an embodiment, the rubber composition comprises oil, such as processing oil. Oil may be included in the rubber composition as extending oil typically used to extend elastomers. Oil may also be included in the rubber composition by addition of the oil directly during rubber compounding. Oil used may include both extending oil present in the elastomers, and (process) oil added during compounding. Suitable oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils.

Glass transition temperatures Tg for oils are determined as a peak midpoint by a differential scanning calorimeter (DSC) at a temperature rate of increase of 10° C. per minute, according to ASTM E1356, or equivalent.

In an embodiment, the rubber composition comprises silica. Silica may be for instance pyrogenic/fumed or precipitated silica. In preferred embodiments, precipitated silica is used. Silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. The BET surface area is determined according to ASTM D6556 or equivalent and is described in the Journal of the American Chemical Society, Volume 60, Page 304 (1930). Silica may also be characterized by having a dibutylphthalate (DBP) absorption value in a range of 100 cm$^3$/100 g to 400 cm$^3$/100 g, alternatively 150 cm$^3$/100 g to 300 cm$^3$/100 g which is determined according to ASTM D 2414 or equivalent. Silica may have an average ultimate particle size, for example, in the range of 0.01 to 0.05 micron as determined by the electron microscope, although the silica particles may be even smaller, or possibly larger, in size. Various commercially available silicas may be used, such as, only for example herein, and without limitation, silicas commercially available from PPG Industries under the Hi-Sil trademark with designations 210, 315G, EZ160G, etc.; silicas available from Solvay, with, for example, designations of Z1165MP and Premium200MP, etc.; and silicas available from Evonik AG with, for example, designations VN2 and Ultrasil 6000GR, 9100GR, etc.

In still another embodiment, the rubber composition may comprise pre-silanized and/or hydrophobated silica which may for instance have a CTAB adsorption surface area of between 130 m$^2$/g and 210 m$^2$/g, optionally between 130 m$^2$/g and 150 m$^2$/g and/or between 190 m$^2$/g and 210 m$^2$/g, or even between 195 m$^2$/g and 205 m$^2$/g. The CTAB (cetyl trimethyl ammonium bromide) method for determination of the silica surface area (ASTM D6845) is known to the person skilled in the art. Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries.

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions (or iodine absorptions numbers) ranging from 9 g/kg to 145 g/kg and a DBP number ranging from 34 cm$^3$/100 g to 150 cm$^3$/100 g. Iodine absorption values are determined according to ASTM D1510 or equivalent.

In one embodiment, the rubber composition may contain sulfur containing organosilicon compounds or silanes. Examples of suitable sulfur containing organosilicon compounds are of the formula:

$$Z\text{-Alk-}S_n\text{-Alk-}Z \qquad\qquad I$$

in which Z is selected from the group consisting of

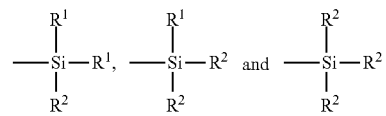

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

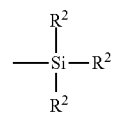

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608, 125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 10 phr, usually 1 phr to 5 phr. Typical amounts of processing aids, if used, comprise for example 1 phr to 50 phr (this may comprise in particular oil). Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e., primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely, at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire (or in other words tire components). For example, the rubber component may be a tread (including tread cap and/or tread base), sidewall, apex, chafer, sidewall insert, wirecoat or innerliner.

In a second aspect of the present invention, the invention is directed to a tire comprising the rubber composition according to the first aspect and or one or more of its embodiments.

For instance, the tire can be a pneumatic tire or nonpneumatic tire, a race tire, a passenger car tire, an aircraft tire, an agricultural tire, an earthmover tire, an off-the-road (OTR) tire, a truck tire, or a motorcycle tire. The tire may also be a radial or bias tire.

Preferably, the tire has a tread comprising the rubber composition.

In an embodiment, the tire is a passenger car tire showing a speed index selected from "W", "Y" or "(Y)" on a lateral side (e.g., sidewall) of the tire. Thus, the tires are UHP, UUHP or race tires allowing to drive at high speed.

Vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The above aspects, their embodiments and/or features may be combined with one another.

DETAILED DESCRIPTION OF THE INVENTION

Below Table 1 shows a non-limiting Inventive Example in accordance with an embodiment of the present invention and a Comparative Example which is not in accordance with the present invention.

TABLE 1

| Ingredient | Amount in phr | |
| --- | --- | --- |
| | Comparative Example | Inventive Example |
| SBR 1[1] | 50 | 90 |
| SBR 2[2] | 40 | 0 |
| BR 1[3] | 10 | 0 |
| BR 2[4] | 0 | 10 |
| Silica 1[5] | 56 | 0 |
| Silica 2[6] | 0 | 65 |
| Carbon Black 1[7] | 62 | 0 |
| Carbon Black 2[8] | 0 | 55 |
| Metal hydroxide[9] | 0 | 15 |
| Oil 1[10] | 44 | 34 |
| Vegetable Oil 2[11] | 0 | 5 |
| Silane 1[12] | 4 | 0 |
| Silane 2[13] | 0 | 6.5 |
| Liquid plasticizer 1[14] | 12 | 0 |
| Resin 1[15] | 10 | 0 |
| Resin 2[16] | 0 | 23 |
| Tackifyer[17] | 0 | 3 |
| Rosins[18] | 5 | 8 |
| Zink Oxide | 2.5 | 1 |
| Waxes | 1.5 | 2 |
| Antidegradants[19] | 5 | 5 |
| Processing Aids[20] | 3 | 4 |
| Accelerators[21] | 4.3 | 4.6 |
| Sulfur | 1.9 | 1.2 |

[1]Styrene butadiene rubber as Sprintan™ SLR 6430 from Trinseo, having a glass transition temperature of about −29° C. and a bound styrene content of 40%; extension oil listed separately
[2]Styrene butadiene rubber as Tufdene™ E680 from Asahi, having a glass transition temperature of about −13° C.; extension oil listed separately
[3]Polybutadiene rubber as Budene™ 1207 from Goodyear, having a glass transition temperature of about −110° C.
[4]Polybutadiene rubber as Budene™ 1223 from Goodyear, having a glass transition temperature of about −108° C.
[5]as Zeosil™ 1165 MP from Solvay, with a BET surface area of about 160 m$^2$/g
[6]as Zeosil™ Premium 200 MP from Solvay, with a BET surface area of more than 215 m$^2$/g.
[7]Carbon Black having an iodine absorption number of more than 190 g/kg
[8]Carbon Black having an iodine absorption number of more than 190 g/kg
[9]Aluminum hydroxide having a surface area of about 4 m$^2$/g, as Hydral™ 710 from Huber
[10]Mineral oil, including extension oil
[11]Sunflower oil
[12]Bis-triethoxysilylpropyl disulfide as SI 266 from Evonik
[13]3-Octanoylthio-1-propyltriethoxysilane as NXT™ from Momentive
[14]Liquid SBR as Ricon™ 100 from Cray Valley
[15]Alpha methyl styrene resin having a softening point of 85° C. and a weight average molecular weight Mw of about 1150 g/mol
[16]C9 modified and hydrogenated dicyclopentadiene resin, as Oppera™ 383 from Exxon Mobil
[17]Tackifier as SP 1068 from Akrochem
[18]Gum rosins
[19]Phenylene diamine and dihydroquinoline types
[20]Zinc soaps of fatty acids and stearic acid derivatives
[21]including DPG, CBS, BDBzTH The compositions of Table 1 have been tested as tire tread compounds with the results shown below in Table 2. All tests have been carried out on the same passenger car vehicle and under the same test conditions. The test results have been normalized to the results of the tires having treads with the rubber composition of the Comparative Example, wherein higher values are better than lower values.

TABLE 2

| Property/Performance | Comparative Example | Inventive Example |
| --- | --- | --- |
| Wet braking performance | 100 | 102.8 |
| Wet handling performance | 100 | 103.9 |
| Dry handling performance | 100 | 101.6 |
| Treadwear | 100 | 100 |
| Rolling resistance performance | 100 | 104.1 |

As shown in Table 2 above, wet braking and wet handling performance and even dry handling performance have been improved in the Inventive Example compared to the Comparative Example. Remarkably, also rolling resistance has been reduced compared to the tire comprising the Comparative Example. The tread wear of the Inventive Example has at least been limited to the level of the Comparative Example.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A rubber composition comprising:
   70 phr to 95 phr of a solution polymerized styrene butadiene rubber having a glass transition temperature within a range of −20° C. and −45° C.;
   5 phr to 30 phr of at least one diene based rubber selected from at least one or more of natural rubber, synthetic polyisoprene, polybutadiene rubber and another styrene butadiene rubber;
   95 phr to 200 phr of filler comprising:
     i) 50 phr to 100 phr of silica,
     ii) 40 phr to 70 phr of carbon black, and
     iii) 5 phr to 30 phr of an inorganic metal hydroxide;
   40 phr to 80 phr of plasticizer comprising a hydrocarbon resin having a softening point within a range of 80° C. to 130° C.

2. The rubber composition of claim 1, wherein the filler comprises:
   from 50 phr to 80 phr of the silica,
   from 45 phr to 65 phr of carbon black, and
   from 10 phr to 25 phr of the inorganic metal hydroxide.

3. The rubber composition of claim 1, wherein the inorganic metal hydroxide is aluminum hydroxide.

4. The rubber composition of claim 1, wherein the rubber composition comprises from 100 to 150 phr of the filler.

5. The rubber composition of claim 1, wherein the plasticizer comprises from 20 phr to 65 phr of oil.

6. The rubber composition of claim 1, wherein the rubber composition comprises from 15 phr to 60 phr of the hydrocarbon resin.

7. The rubber composition of claim 1, wherein the rubber composition comprises from 15 phr to 35 phr of the hydrocarbon resin and from 25 phr to 50 phr of oil.

8. The rubber composition of claim 1, wherein the hydrocarbon resin is selected from one or more of: coumarone-indene resin, petroleum hydrocarbon resin, terpene resin, styrene/alphamethylstyrene resin, terpene phenol resin, and copolymers and/or mixtures thereof.

9. The rubber composition of claim 1, further comprising from 5 phr to 15 phr of gum rosin.

10. The rubber composition of claim 1, further comprising from 3 phr to 9 phr of 3-(octanoylthio)-1-propyltriethoxysilane.

11. The rubber composition of claim 1, wherein the silica has a BET surface area of at least 185 m$^2$/g.

12. The rubber composition of claim 1, wherein the carbon black has an iodine absorption number of at least 180 g/kg.

13. The rubber composition of claim 1, further comprising a diene based rubber chosen from natural rubber, synthetic polyisoprene, polybutadiene rubber, and another styrene butadiene rubber.

14. The rubber composition of claim 1, wherein the styrene butadiene rubber has a glass transition temperature within a range of −20° C. and −49° C. and wherein the further diene based rubber comprised in the rubber composition has a glass transition temperature within a range of −51° C. and −110° C.

15. The rubber composition of claim 1, wherein the further diene based rubber comprised in the rubber composition comprises a polybutadiene having a glass transition temperature within a range of −100° C. to −110° C.

16. The rubber composition of claim 1, comprising from 3 phr to 10 phr of a vegetable oil having a glass transition temperature of less than −90° C. and from 20 to 40 phr of a mineral oil.

17. A tire comprising the rubber composition of claim 1.

18. The tire according to claim 17, wherein the tire has a tread comprising the rubber composition.

19. The tire according to claim 18, wherein the tire is a passenger car tire showing a speed index of "W", "Y", or "(Y)" on a lateral side of the tire.

* * * * *